United States Patent
Eschbach et al.

(10) Patent No.: US 6,995,872 B2
(45) Date of Patent: Feb. 7, 2006

(54) REDUCED-BUFFER ERROR DIFFUSION

(75) Inventors: Reiner Eschbach, Webster, NY (US);
Dennis L. Venable, Marion, NY (US)

(73) Assignee: Xerox Corporation, Stamford, CT (US)

( * ) Notice: Subject to any disclaimer, the term of this patent is extended or adjusted under 35 U.S.C. 154(b) by 994 days.

(21) Appl. No.: 10/017,016

(22) Filed: Dec. 14, 2001

(65) Prior Publication Data

US 2003/0112468 A1    Jun. 19, 2003

(51) Int. Cl.
H04N 1/40      (2006.01)
H04N 1/405     (2006.01)

(52) U.S. Cl. .................................. 358/3.03; 358/3.04
(58) Field of Classification Search ............... 358/1.9, 358/3.03–3.05; 382/252; 345/616
See application file for complete search history.

(56) References Cited

U.S. PATENT DOCUMENTS

| | | |
|---|---|---|
| 4,149,194 A | 4/1979 | Holladay |
| 5,045,952 A | 9/1991 | Eschbach |
| 5,208,871 A | 5/1993 | Eschbach |
| 5,226,094 A | 7/1993 | Eschbach |
| 5,245,678 A | 9/1993 | Eschbach et al. |
| 5,353,127 A | 10/1994 | Shiau et al. |
| 5,555,095 A * | 9/1996 | Inuzuka et al. ............ 358/3.03 |
| 5,931,960 A * | 8/1999 | Kletter et al. ............. 358/3.03 |
| 6,016,370 A * | 1/2000 | Hatakeyama et al. ....... 382/252 |
| 6,201,612 B1 * | 3/2001 | Matsushiro et al. ......... 358/1.9 |
| 6,594,035 B1 * | 7/2003 | Kresch et al. ............. 358/3.03 |
| 6,731,401 B1 * | 5/2004 | Kakutani .................... 358/1.9 |

* cited by examiner

*Primary Examiner*—Scott A. Rogers
(74) *Attorney, Agent, or Firm*—Fay, Sharpe, Fagan, Minnich & McKee, LLP

(57) ABSTRACT

An error diffusion method is provided where a plurality of n error values derived from processing one or more previous scanlines of input pixel values are sub-sampled without the n error values being stored in a buffer to derive m error values (m<n). In one example, a reduction factor R is used according to m=n/R. In another example, a two-dimensional reduction operation is performed. The m error values, rather than the original n error values, are used as input for subsequent error diffusion operations. This allows for storage of m error values rather than n error values and, thus, error buffer requirements are reduced. Image quality has been found to be comparable to conventional error diffusion operations when the reduction factor used is maintained within reasonable limits. The sub-sampling operation can be accomplished according to any suitable method. As described herein, either an averaging operation or a summation operation (with appropriate weight adjustments in the error diffusion operations) can be used to derive the m error values from the n original error values.

20 Claims, 6 Drawing Sheets

REDUCED-BUFFER ERROR DIFFUSION

BACKGROUND OF THE INVENTION

The present invention relates generally to the art of digital image processing. More particularly, the present invention relates to a novel and unobvious method and apparatus for error diffusion with reduced buffer requirements.

In the digital reproduction of documents, an image is conveniently represented as a bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user.

For color images, a plurality of bitmaps, each forming a color separation are combined. Each color separation may be defined by a number of gray levels in excess of the capability of the printer. In digital reproduction of color documents, each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

In printing documents, the desired density over an area is commonly achieved by halftoning, where image density variation is represented by placing greater or less numbers of ON pixels in a discrete area of the image for the binary case or by varying the number and/or the level of pixels for the non-binary case. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the image pixels or cell elements for which the thresholds are exceeded might be printed as a maximum colorant value, while the remaining separation pixels are allowed to remain white, dependent on the actual physical quantity described by the data. The described halftoning method produces an output pattern that is periodic or quasi-periodic in the spatial coordinates.

Error diffusion is another halftoning method and is taught in "An Adaptive Algorithm for Spatial Greyscale" by Floyd and Steinberg, Proceedings of the SID 17/2, 75–77 (1976) (hereinafter, "Floyd and Steinberg"). Error diffusion attempts to maintain gray by making the conversion from gray pixels to binary or other level pixels on a pixel-by-pixel basis. The procedure examines each pixel with respect to a threshold, and the difference or "error" between the gray level pixel value and the output value is propagated to a selected group or set of neighboring pixels, in accordance with a weighting scheme. The output binary pattern of the error diffusion algorithm and its derivatives is a pattern with a local periodicity related to the input density level, but with no global periodicity, see "Analytic Description of the 1-D Error Diffusion Technique for Halftoning," Optics Communications, Vol. 52, No. 3, 165–168 (1984) by R. Eschbach and R. Hauck.

Other error diffusion methods include, "On the Error Diffusion Technique for Electronic Halftoning" by Billotet-Hoffmann and Bryngdahl, Proceedings of the SID, Vol. 24/3, (1983), pp. 253–258; and U.S. Pat. No. 5,226,094 to Eschbach. A technique related to error diffusion is taught in the MAE (Minimum Average Error) method of error diffusion described in "Images from Computers", by M. Schroeder, IEEE Spectrum, March 1969, pp. 66–78, in which an error correction is performed that only affects a local neighborhood. One particularly effective error diffusion variant is taught in U.S. Pat. No. 5,353,127 to Shiau et al.

Error diffusion, in a variety of forms, has enjoyed widespread commercial success in connection with rendering digital images for a multitude of applications. The comparatively high rendering quality of error diffusion, when compared to standard halftoning, is somewhat compromised by slower rendering speeds and large buffer requirements for storage and processing of the error values. The large buffer requirements increase the manufacturing cost of a digital image processing apparatus implementing the error diffusion method.

SUMMARY OF THE INVENTION

In accordance with a first aspect of the present invention, a method of processing a digital image that is defined in terms of a plurality of scanlines each comprising n input pixel values includes performing an error diffusion operation on a first scanline of n input pixel values. A first plurality of error values are derived from the error diffusion operation performed on said first scanline of n input pixel values. m error values are derived from the first plurality of error values. m<said first plurality of error values. The m error values are stored in an error buffer. An error diffusion operation is performed on a second scanline of n input pixel values to modify the input pixel values of the second scanline using the m error values stored in the error buffer.

In accordance with another aspect of the present invention, a method of digital image processing includes performing an error diffusion operation on successive scanlines of input pixel values that define a digital image. The error diffusion operation includes processing at least a first scanline of input pixel values according to the error diffusion operation and obtaining at least n error values. The n error values are sub-sampled to obtain m error values, wherein m<n. The m error values are stored in an error buffer. A second scanline of input pixel values are processed according to the error diffusion operation using error values selected from the m error values stored in the error buffer as input.

In accordance with another aspect of the present invention, a digital image processing apparatus includes an error buffer, means for processing at least a first scanline of input pixel values according to a select error diffusion operation and obtaining at least n error values, and means for sub-sampling the n error values to obtain m error values, wherein m<n. The apparatus further includes means for storing the m error values in the error buffer. Means are provided for processing a second scanline of input pixel values according to the select error diffusion operation using error values selected from the m error values stored in the error buffer as input.

One advantage of the present invention resides in the provision of a method and apparatus for error diffusion wherein buffer requirements are significantly reduced while preserving image quality.

A further advantage of the present invention is found in the provision of an error diffusion method that reduces buffer requirements and, consequently, can be implemented in firmware of a relatively low-cost systems such as office printers and copiers.

Another advantage of the present invention resides in the provision of an error diffusion method for multi-separation (i.e., color) images that exhibits buffer requirements that are comparable to the buffer requirements exhibited by conventional error diffusion techniques in connection with single-separation (i.e., monochrome) images with comparable quality.

Still other benefits and advantages of the present invention will become apparatus to those of ordinary skill in the art to which the invention pertains upon reading this specification.

Another important attribute of the present invention is its general compatibility with other error diffusion modifications as, multi-level error diffusion, originally mentioned by Floyd and Steinberg, edge enhanced error diffusion as, e.g.: described in U.S. Pat. No. 5,045,952 to Eschbach, weight modifications, including changing the error feedback amount, as, e.g.: described in U.S. Pat. No. 5,245,678 to Eschbach et. al., using space variant weights as, e.g.: described in U.S. Pat. No. 5,208,871 to Eschbach, and other published or unpublished modifications. The disclosures of U.S. Pat. Nos. 5,045,952, 5,245,678 and 5,208,871 are hereby expressly incorporated by reference.

BRIEF DESCRIPTION OF THE DRAWINGS

The invention comprises various components and arrangements of components, and various steps and arrangements of steps, preferred embodiments of which are disclosed herein with reference to the accompanying drawings that form a part hereof and wherein.

DETAILED DESCRIPTION OF PREFERRED EMBODIMENTS

Figure 1:
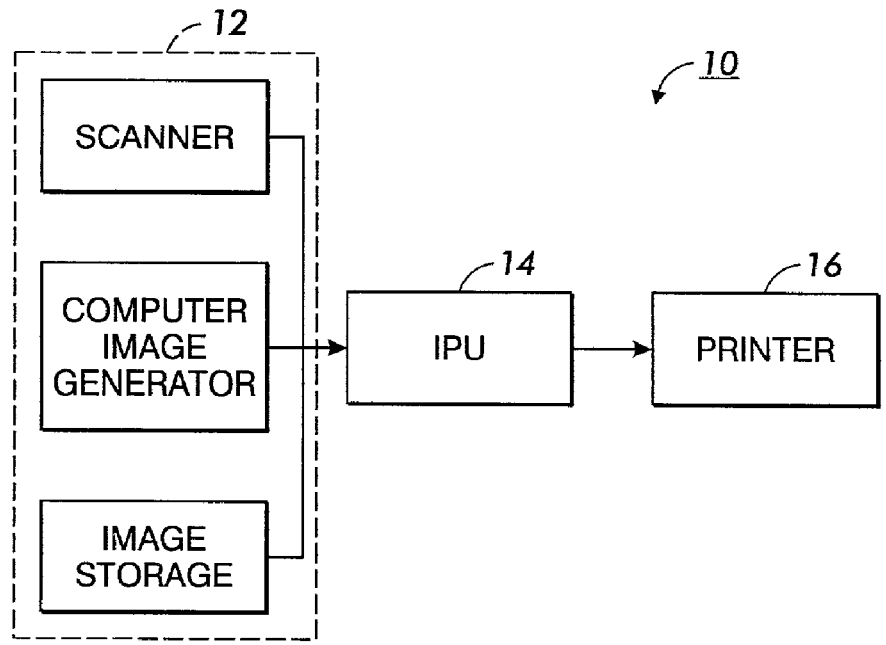
FIG. 1 is a diagrammatic illustration of an image processing system that implements error diffusion in accordance with the present invention.

Referring now to the drawings where the showings are for purposes of describing preferred embodiments of the invention only and not for purposes of limiting same, a digital image processing system 10 is shown in FIG. 1. An image input terminal 12 comprises a scanner, computer image generator, image storage device, and/or other source of digital image data which derives and/or delivers digital image data in the form of one or more monochromatic separations, wherein the picture elements or "pixels" of each separation are defined at a depth of "d" bits per pixel where "d" is an integer. Accordingly, each pixel of each separation is defined in terms of "d" bits per pixel (bit depth=d), and each pixel has some "gray" value between full "off" (e.g., gray value=0) and full "on" (e.g., gray value=255). These pixels are arranged in a matrix of rows and columns, wherein the rows are often referred to as "scanlines." Those of ordinary skill in the art will recognize that gray values may lie in a different range, e.g., 0-to-1, and that such gray values are equivalent to gray values in the range of 0–255 by virtue of the fact that simple scaling operations may be performed. When the digital image data is provided in terms of at least two monochromatic separations, a color image results when the data from the separations is combined, for example, red-green-blue (RGB) separations or cyan-magenta-yellow (CMY) separations.

With continuing reference to FIG. 1, the image signals are input from the image input terminal 12 to an image processing unit (IPU) 14 wherein digital image processing, such as reduced-buffer error diffusion in accordance with the present invention, is performed. The IPU 14 may be provided by any suitable electronic computing apparatus such as an electronic computer, a dedicated electronic circuit, or any other suitable electronic circuit means, device and/or software. The IPU 14 outputs data in a suitable format to a printer 16 that renders the digital image on paper or another recording medium. The units 12, 14 and 16 can be combined into a single apparatus or distributed relative to each other and connected by a cable or other wired or wireless connection.

Figure 2:
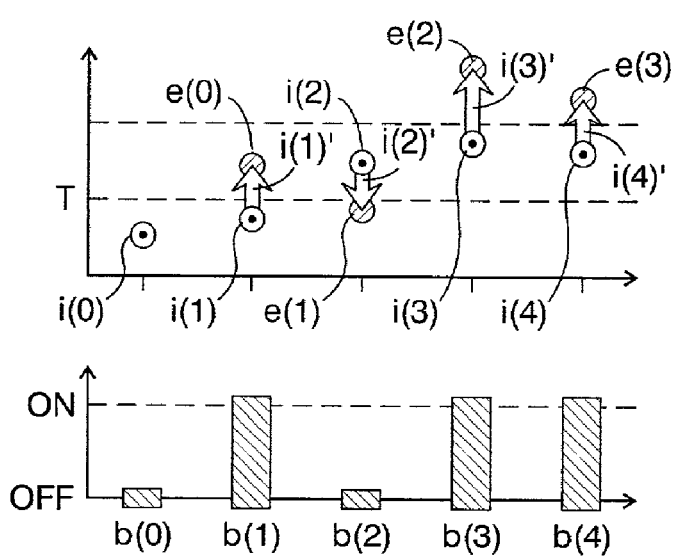
FIG. 2 graphically illustrates a conventional 1-dimensional error diffusion method.

In the conventional 1-dimensional error diffusion illustrated in FIG. 2, a first pixel input value i(0) is compared to a threshold T. Because i(0)<T, a first binary output value b(0) is set to a first of two binary states corresponding to "off," e.g., b(0)=0. A first error value e(0) is derived according to the equation e(0)=b(0)−i(0). This first error value e(0) is propagated to the next sequential, i.e., second, input pixel value i(1) to derive an error-modified second input pixel value i(1)' according to the equation i(1)'=i(1)−e(0). The error-modified second input pixel value i(1)' is compared to the threshold T to derive a corresponding second binary output value b(1). In this case, i(1)'>T so the second binary output value b(1) is set to the second of the two binary states corresponding to "on," e.g., b(1)=255. A second error value e(1) is derived according to the equation e(1)=b(1)−i(1)', and the above-described process continues until all input pixels are processed to obtain corresponding binary output values. Of course, this is simply one example of a conventional 1-dimensional error diffusion method. The extension to more than two output levels is straight forward and known, where the different output levels might be created by changing the colorant concentration, the colorant layer thickness, the spot size of the output pixels or any other physical attribute of the output pixel.

Figure 3:
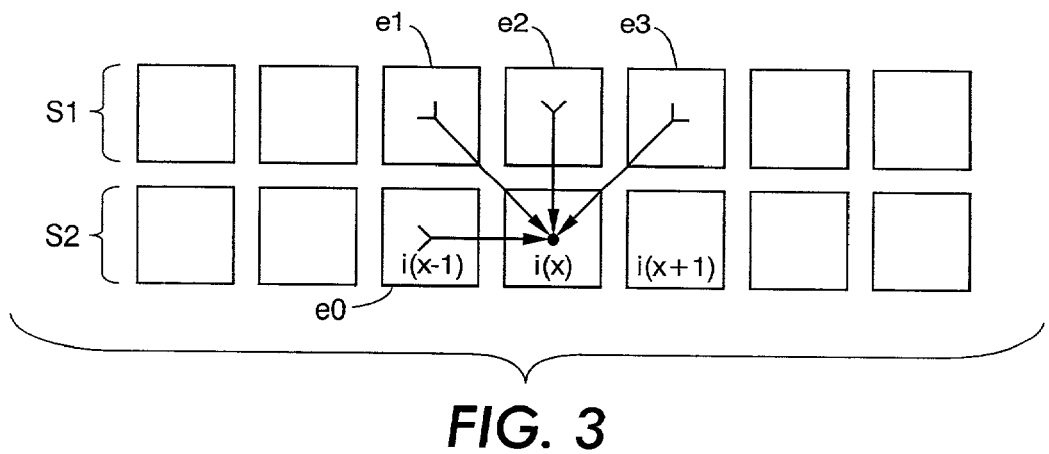
FIG. 3 diagrammatically illustrates a conventional 2-dimensional error diffusion method.

FIG. 3 illustrates one example of a conventional 2-dimensional error diffusion method. There, an input pixel value i(x) found in a scanline S2 of image data is modified by receiving multiple error values e0, e1, e2, e3 in two dimensions. Typically, the error values are weighted according to a weighting scheme that can vary widely.

A full scanline S1 of error values, referred to herein as the "error buffer," holds the error values e1, e2 and e3 (obtained by storing all error values derived from processing a previous scanline of image data). The error value e0 is referred to herein as PREVIOUS_ERROR and is simply the error value derived from processing one or more previous input pixel values, e.g., the input pixel value i(x−1), found in the scanline S2. Thus, in processing a scanline of input pixel values S2 for two-dimensional error diffusion, at least a full scanline S1 of error values is required to be stored to provide access to the error values required for processing each of the input pixel values. In addition, the PREVIOUS-ERROR error value e(0) must be stored. Of course, the error values resulting from processing all of the input pixels of the scanline S2 must be saved for use in processing the next scanline of input pixel values. It should be noted that a physically equivalent implementation can be obtained by updating the future input pixels immediately. In that case, the error buffer is simply replaced by an input pixel buffer fulfilling the identical function, i.e.: collection of error values, and the invention is intended to cover these and other equivalent cases, though, for simplicity, we will only use one description.

As will be readily apparent to those of ordinary skill in the art, two-dimensional error diffusion (even as simply illustrated in FIG. 3) requires storage of relatively large numbers of error values in buffers. In lower priced printers and the like, these buffers are often found in the printer 16, itself. As buffer requirements increase, the cost of the printer apparatus increases. This is aggravated by the fact that buffer memory must often be installed in relatively large blocks. Thus, a small increase in buffer memory requirements can lead to a large increase in installed memory and price. Conversely, a small reduction in buffer requirements can result in a large decrease in price if one or more blocks of buffer memory can be eliminated.

Figure 4:
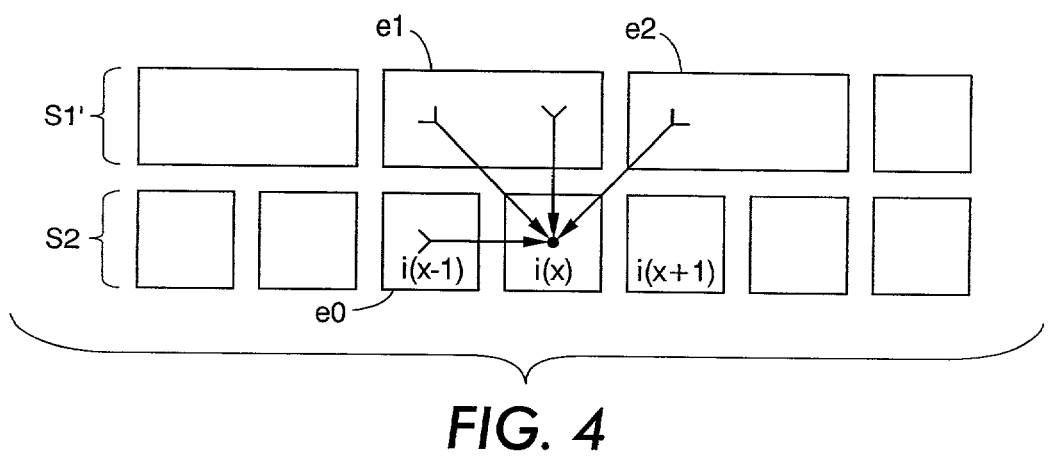
FIG. 4 diagrammatically illustrates a reduced-buffer error diffusion method in accordance with the present invention for use in deriving an output value corresponding to an input pixel value.

A reduced-buffer error diffusion method in accordance with the present invention is diagrammatically illustrated in FIG. 4. As illustrated, the input pixel i(x) receives only three different error values e0, e1, e2, with the error value e1 being used twice. Here and in the following we will use the description of accessing certain error storage units multiple times (two times in FIG. 4), since this allows the use of standard error diffusion weight description for clarity. It should be noted that in a different preferred embodiment the multiple access can be equivalently obtained using single access with space variant weights, i.e. the weights used in error diffusion are not constant as in standard error diffusion, but vary as a function of spatial location. In this case, the scanline of error values S1', also referred to herein as the "error buffer," is maintained at a reduced resolution relative to the error buffer S1 of FIG. 3 to reduce memory requirements for the error buffer S1', i.e., the number of error values stored in the error buffer S1' is less than the number of pixels that define a scanline of image data for the image to be rendered by the printer 16.

In the example illustrated in FIG. 4, the error buffer S1' is maintained at half resolution relative to the buffer S1 illustrated in FIG. 3 and relative to the scanline S2 of input pixel values being processed. Thus, those of ordinary skill in the art will recognize that the storage requirements for the error buffer S1' are half those for the full-resolution error buffer S1. In a preferred embodiment, the error values in the half resolution error buffer S1' are obtained by averaging every two adjacent error values of the full resolution error buffer S1.

Figure 5:
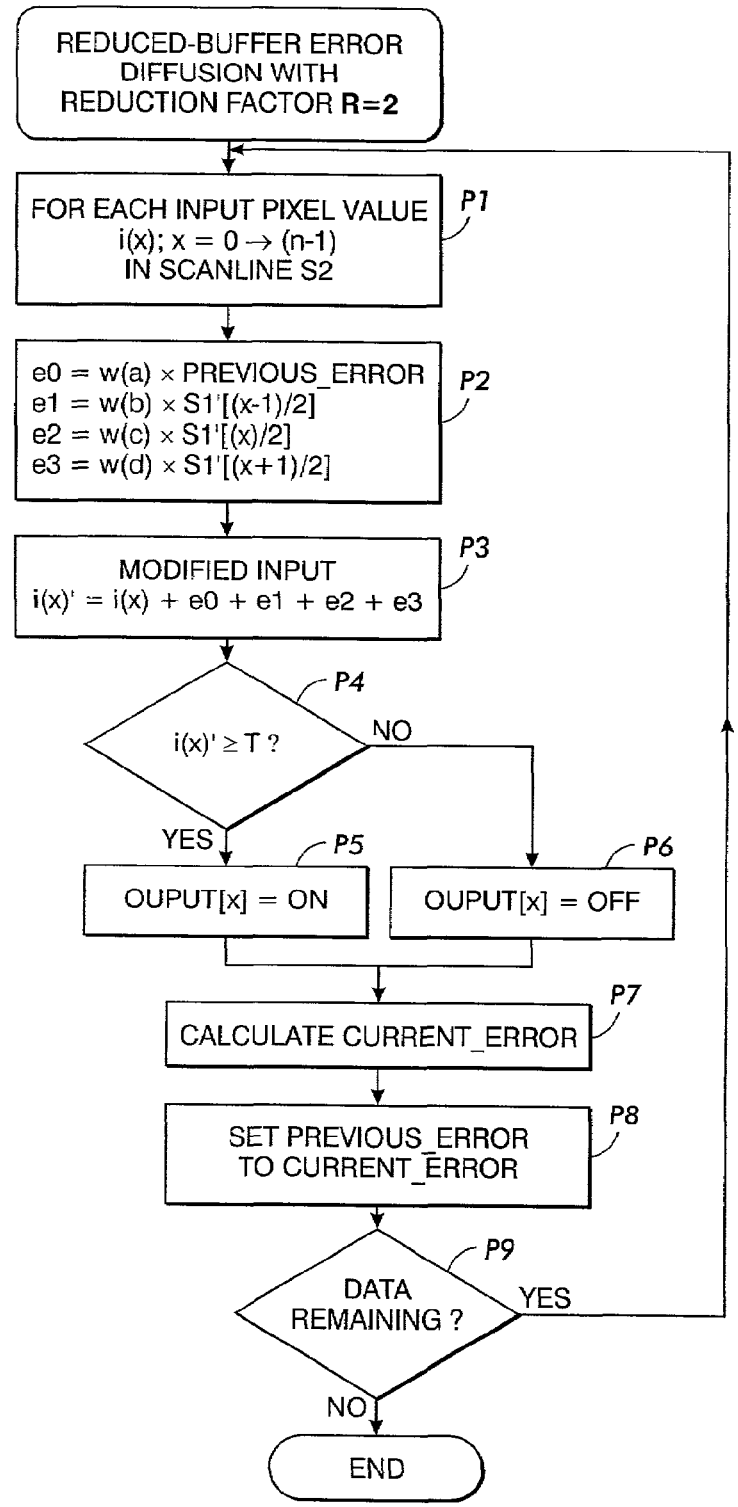
FIG. 5 is a flow chart disclosing reduced-buffer error diffusion in accordance with one embodiment of the present invention using a buffer reduction factor of 2)

With reference now to FIG. 5, reduced-buffer error diffusion in accordance with the present invention is disclosed for the case illustrated in FIG. 4, i.e., where the original error buffer S1 has been reduced by a reduction factor of R=2 to obtain the reduced-resolution error buffer S1'. The scanline S2 is a scanline of "n" input pixel values being processed according to the present invention.

As shown in FIG. 5, a step P1 operates on each input pixel value i(x) in the scanline S2, wherein x=0 to n−1. For each input pixel value i(x), a step P2 calculates the error values e0−e3 as shown. Specifically, the error value e0 is simply the value PREVIOUS_ERROR, i.e., the error value associated with the just-previously-processed input pixel value i(x−1) in the scanline S2 as multiplied by a weight value w(a). The error value e1 is obtained by accessing the error buffer S1' at location (x−1)/2 and multiplying the retrieved value by a weight value w(b). Error value e2 is derived by accessing the error buffer S1' at location x/2 and multiplying the retrieved value by a weight value w(c). Finally, the error value e3 is obtained by accessing the error buffer S1' at location (x+1)/2 and multiplying the retrieved value by a weight value w(d). Here, all divisions that are calculated to determine pixel location are to be understood as integer operations, resulting in an integer pixel value. The weight values w(a), w(b), w(c) and w(d) are conventional and can be specified based on other application requirements.

The location at which the error buffer is accessed is controlled by the step P2 as just described. It should be recognized that, the "divide by 2" operation used in calculating the error values e1−e3 is replaced by a "divide by R" in the general case, where R is the reduction factor by which the full-resolution error buffer S1 is reduced to obtain the reduced resolution error buffer S1'.

In a step P3, these error values e(0)−e(3) are added to the input pixel value i(x) to obtain a modified input pixel value i(x)'. According to a step P4, this modified input pixel value i(x)' is compared to a threshold T. If i(x)'≧T, the binary output value output[x] corresponding to the input pixel value i[x] is set to "on" by the step P5. On the other hand, where the modified input pixel value i(x)'<T, the corresponding binary value output[x] is set to "off" in a step P6. In either case, a step P7 includes calculating a variable CURRENT_ERROR, which is the error resulting from processing the input pixel i(x), by subtracting the value output[x] from the modified input value i(x)'. In a step P8, the value of the variable PREVIOUS_ERROR is updated with the value of CURRENT_ERROR for use in processing the input pixel value i(x+1). A step P9 determines if input pixel data remain in the scanline S2 for processing. If so, control returns to P1; if not, the error diffusion process is terminated for the scanline S2.

Figure 6:
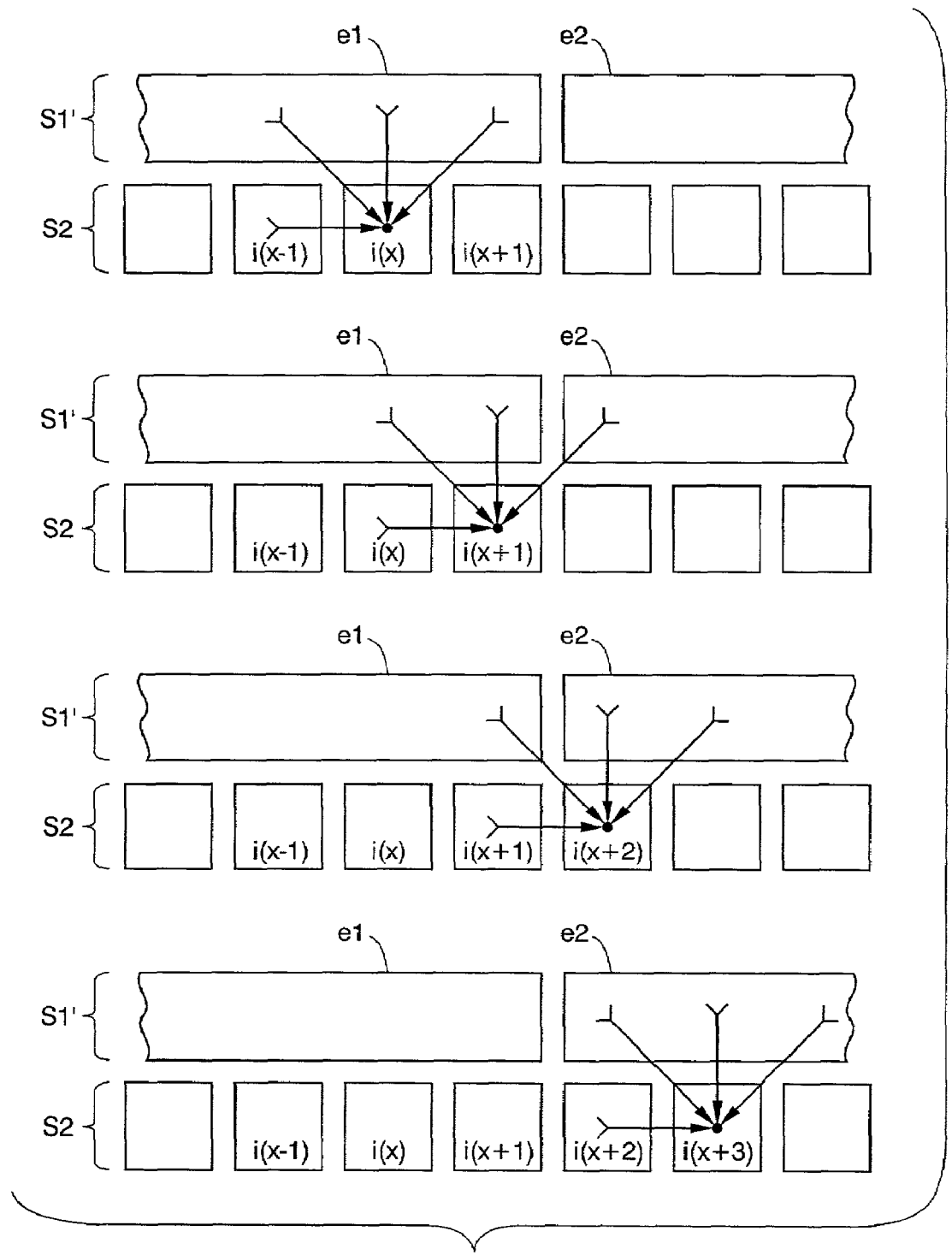
FIG. 6 diagrammatically illustrates a reduced-buffer error diffusion method in accordance with the present invention for use in deriving output values corresponding to a sequence of input pixel values.

Referring now to FIG. 6, illustrates the process of FIG. 5 in the general case as applied for a sequence of input pixel values i(x), i(x+1), i(x+2) and i(x+3) from the scanline S2. In particular, it is clear with reference to FIG. 6 that the "neighborhood" of the error buffer S1' accessed transitions for a sequence of input pixel values. Furthermore, this transitioning of the access "neighborhood" of the error buffer S1' results effectively in space-variant error distribution weights owing to the fact that the contribution of each location in the error buffer S1' varies in a manner dependent upon which input pixel value is being processed. Consequently, as mentioned previously, a multiple error location access scheme can be equivalently replaced by a direct space variant weight component.

More particularly, with reference to FIG. 6, it can be seen that the input pixel value i(x) receives error input only from location e1 of the error buffer S1'. Input pixel value i(x+1) receives error input from both locations e1 and e2, with the location e1 being accessed twice or accessed once and weighted accordingly to account for its added influence relative to the location e2, which is accessed only once. The input pixel value location i(x+2) also receives error input from both location e1 and e2 of the error buffer S1', with the location e1 accessed once and the location e2 accessed twice or weighted accordingly. Finally, the input pixel value i(x+3) receives error input only from error location e2.

Those of ordinary skill in the art will recognize that, in the general case, the method of the present invention allows for a plurality of n error values derived from error diffusion operations to be sub-sampled to derive m error values (m<n) using a reduction factor R according to m=n/R so that only the reduced number of m error values and not the original n error values are stored in a buffer. The m error values, rather than the full set of n error values, are used as input for subsequent error diffusion operations. The sub-sampling operation can be accomplished according to any suitable method. As described herein, either an averaging operation or a summation operation (with appropriate weight adjustments) can be used to derive the m error values from the n original error values. It is not intended that the sub-sampling operation be limited to these methods. Furthermore, it will be recognized that the averaging, summation or other sub-sampling operation acts on the original n error values as they are derived so as to eliminate the need to store these values in a buffer. By way of example, if n=80 and a reduction factor of R=4 is used, m=80/4=20 groups of four error values that must be sub-sampled. In the example of using an average value for sub-sampling, the average of each group of 4 error values can be calculated without storing the n=80 error values in a buffer. Instead, for each group, one-fourth of each error value associated with that group is added to a running total for that group.

Figure 7A:
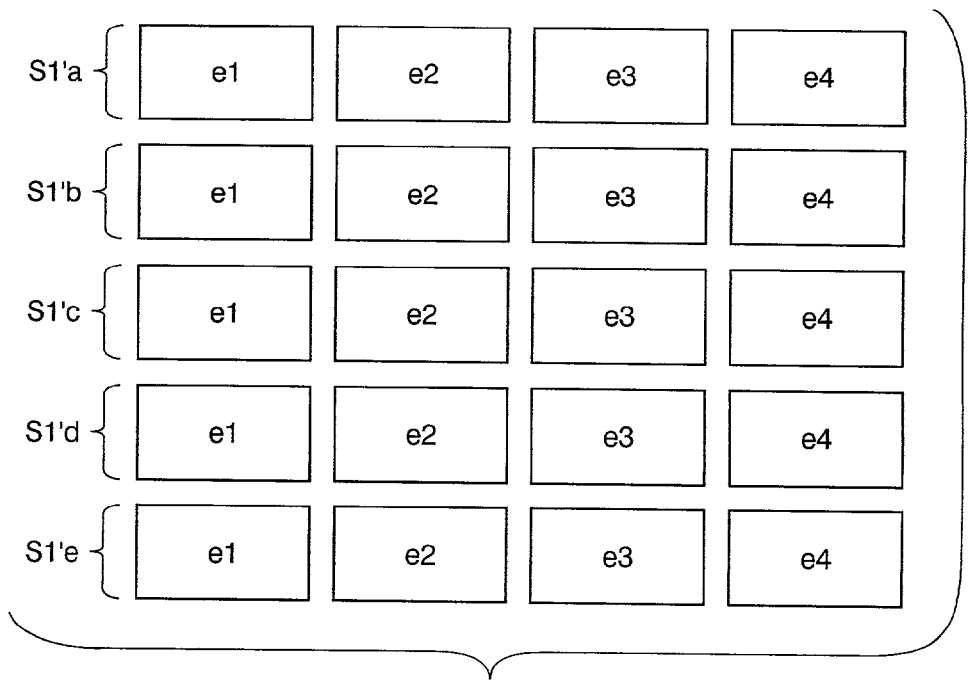
FIGS. 7A and 7B illustrate successive reduced-resolution error buffers derived in accordance with the present invention, wherein FIG. 7B diagrammatically illustrates the successive error buffers being offset from each other to minimize introduction of a vertical periodic structure into a resulting error-diffused image.

FIG. 7A diagrammatically illustrates a plurality of reduced-resolution error buffers S1'a, S1'b, S1'c, S1'd and S1'e used to process successive scanlines of input pixel data in accordance with the present invention. Each error buffer is represented by four error buffer locations e1–e4, each of which comprises an average error value obtained by averaging four adjacent error values from a full-resolution error buffer, i.e., reduction factor R=4. Those of ordinary skill in the art will recognize that use of successive reduced-resolution error buffers S1'a–S1'e as shown can result in a vertical column-like periodic structure being introduced into the resulting error-diffused image owing to the highly structured arrangement of the error locations e1–e4 and the fact that each error location is based upon a reduction factor R=4, i.e., each error location represents an average of four error values from the full-resolution error buffer. This potential vertical structure will have a periodicty corresponding to reduction factor by which the error buffer S1 is reduced to obtain the reduced-resolution error buffer S1'. Furthermore, this vertical structure in the resulting error-diffused image will become more prominent as the reduction factor increases.

In an effort to counter or minimize the introduction of any periodic vertical structure in the error-diffused image, it is deemed desirable to introduce an offset into the reduced-resolution error buffers S1'a–S1'e, wherein the offset is between successive error buffers S1'a–S1'e locations. This method is illustrated diagrammatically in FIG. 7B. There, it can be seen that the error buffer S1'b is offset by one error value relative to the error buffer S1'a. The error buffers S1'c and S1'e are offset by two error values relative to the error buffer S1'a. The error buffer S1'd is not offset relative to the error buffer S1'a. It is preferred that the offset introduced into each error buffer by a random or pseudo-random number. This offset can be real, in the sense that the error values in the error buffer S1' are actually shifted from a non-offset position, or simply introduced by altering the error buffer addressing scheme.

Figure 7B:
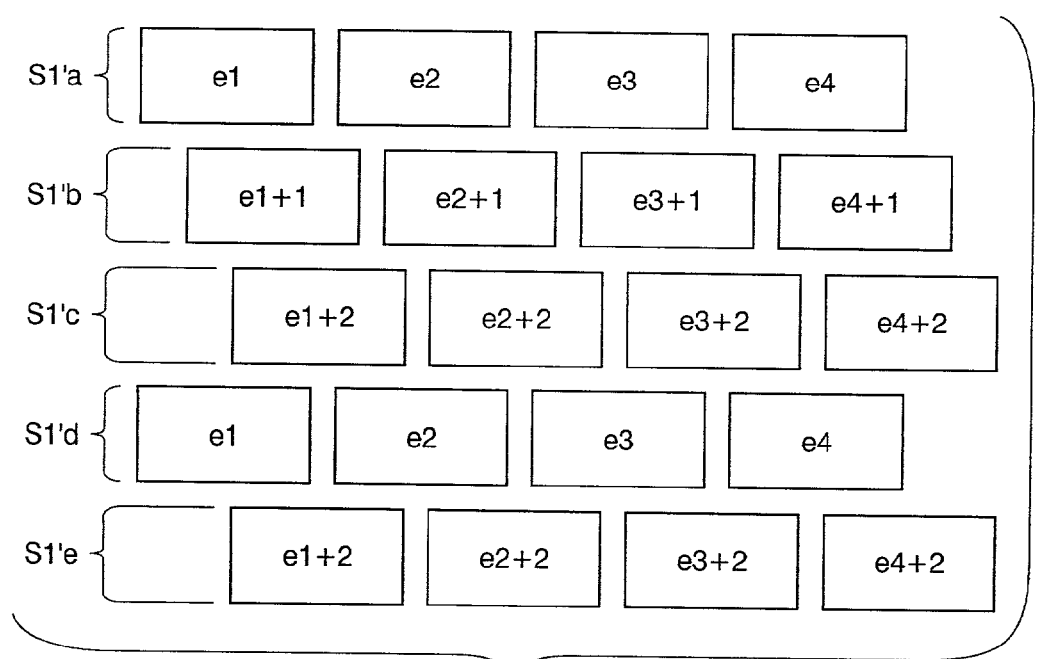

In either case, the effect of introducing an offset into successive reduced-resolution error buffers S1'a–S1'e as shown in FIG. 7B is that, for a given input pixel location i(x) in a plurality of scanlines being processed, the error values at locations e1–e4 of the error buffer accessed will have a different contribution to the modification of the input pixel value at the location i(x). For example, a first input pixel value from a first scanline of input pixel values may access only a single error location e1–e4 of a reduced-resolution error buffer S1'a–S1'e. A second, identically situated input pixel value from a second scanline of input pixel values will access two different error locations e1–e4.

Figure 8:
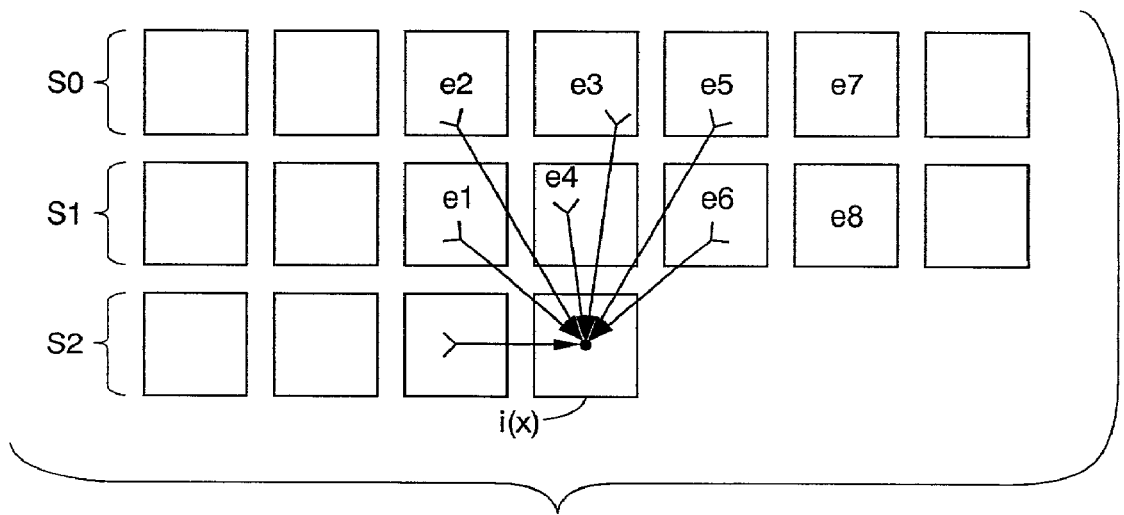
FIG. 8 diagrammatically illustrates a second conventional 2-dimensional error diffusion method.

As shown in FIG. 8 and as is generally known, certain conventional error diffusion methods utilize first and second full-resolution error buffers S0,S1 in order to process a scanline S2 of input pixel values. As illustrated, an input pixel value i(x) receives error values e1–e6 from the error buffers S0 and S1.

Figure 9:
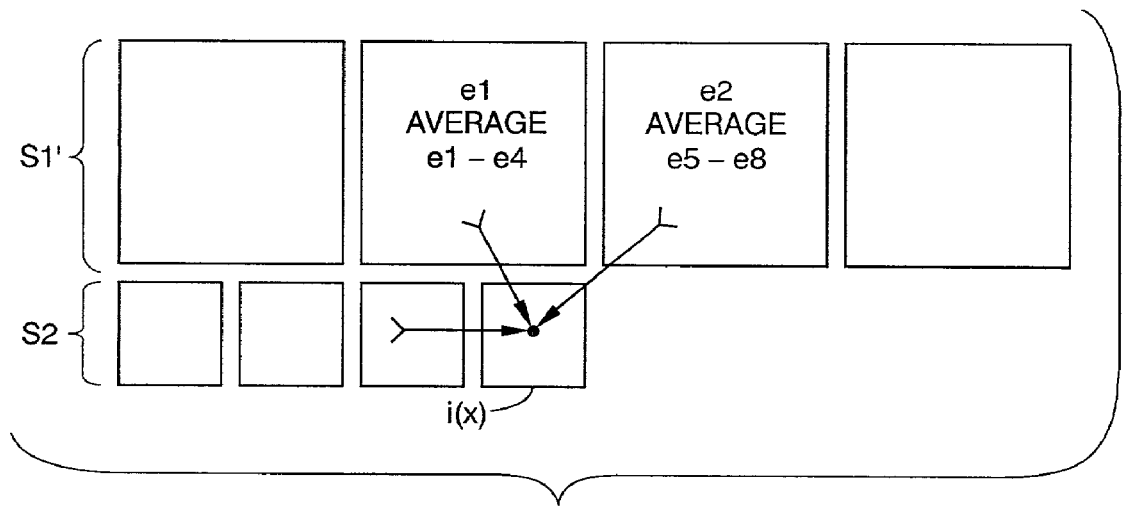
FIG. 9 diagrammatically illustrates a second reduced-buffer error diffusion method in accordance with the present invention that is effective in reducing buffer requirements in two dimensions.

FIG. 9 illustrates a reduced-buffer error diffusion method that reduces error buffer requirements in two dimensions whereby the resolution and number of error buffers are both reduced. In particular, the error buffers S0 and S1 have been replaced by a single, reduced-resolution error buffer S1' obtained by applying a reduction factor of 2 in two dimensions using an averaging operation. As such two full-resolution error buffers S0,S1 are combined into a single half-resolution error buffer S1'. As illustrated, the error location e1 of the reduced-resolution error buffer S1' represents an average of the error values e1–e4 of the error buffers S0 and S1, while the error location e2 of the reduced-resolution error buffer S1' represents an average of the error values e5–e8 of the error buffers S0 and S1. It should be noted that for simplicity a 2×2 reduction was used. There is no requirement for the reduction to be identical along fast and slow scan direction. Also, in the weight distribution indicated in FIG. 8, a one-dimensional reduction might be used for both error buffer scanlines S0,S1, i.e., each error buffer scanline S0 and S1 of n error values can be separately reduced by a reduction factor R to derive two new reduced-resolution error buffer scanlines each defined by m error values according to m=n/R as described. These reduced-resolution error buffers are then used to perform the error diffusion operation on the input pixel values found in the scanline S2.

As described above, the reduced-buffer error diffusion method relies upon averaging error values to obtain a reduced-resolution error buffer. In an equivalent method, a summation operation is performed on multiple error values to obtain each error value of the reduced-resolution error buffer. In such case, however, the weights w applied to the error values in the reduced-resolution error buffer are replaced by new weights that account for the summation operation. In one example, this is accomplished by dividing the original weights by the reduction factor employed.

The invention has been described with reference to preferred embodiments. Modifications and alterations will occur to those of ordinary skill in the art to which the invention pertains upon reading this specification. It is intended that the invention be interpreted as encompassing all such modifications and alterations insofar as they fall within the scope of the following claims as construed literally or according to the doctrine of equivalents.

Having thus described the preferred embodiments, what is claimed is:

1. A method of processing a digital image that is defined in terms of a plurality of scanlines each comprising n input pixel values, said method comprising:
    performing an error diffusion operation on a first scanline of n input pixel values;
    deriving a first plurality of error values from said error diffusion operation performed on said first scanline of n input pixel values;
    deriving m error values from said first plurality of error values, wherein m<said first plurality of error values;
    storing said m error values in an error buffer; and,
    performing an error diffusion operation on a second scanline of n input pixel values to modify said input pixel values of said second scanline using said m error values stored in said error buffer.

2. The method as set forth in claim 1, wherein said step of deriving a first plurality of error values from said first error diffusion operation comprises deriving n error values.

3. The method as set forth in claim 2, wherein said step of deriving m error values from said first plurality of n error values comprises grouping said n error values into m sub-groups of error values as said n error values are derived.

4. The method as set forth in claim 3, further comprising:
    performing an averaging operation on each of said m sub-groups of error values to derive an average error value for each of said m sub-groups.

5. The method as set forth in claim 2, wherein said step of deriving m error values from said n error values comprises:
    using a reduction factor R to divide said n error values into m sub-groups of error values according to m=n/R as said n error values are derived.

6. The method as set forth in claim 5, further comprising:
    averaging the R error values defining each of said m sub-groups of error values to derive m error values.

7. The method as set forth in claim 3, further comprising:
    summing said error values defining each of said m sub-groups of error values to derive an error value sum for each of said m sub-groups.

8. The method as set forth in claim 1, further comprising:
    deriving a second plurality of error values from said error diffusion operation performed on said second scanline of input pixel values;
    deriving m error values from said second plurality of error values, wherein m<said second plurality of error values;
    storing said m error values in said error buffer; and,
    performing an error diffusion operation on a third scanline of n input pixel values to modifying each of said input pixel values of said third scanline using said m error values stored in said error buffer, wherein first and second different offset values are used respectively in said error diffusion operations performed on said second and third scanlines of input pixel values so that similarly situated input pixel values in said second and third scanlines are modified by differently situated error values in said error buffer.

9. A method of digital image processing comprising:
    performing an error diffusion operation on successive scanlines of input pixel values that define a digital image, said error diffusion operation comprising:
    processing at least a first scanline of input pixel values according to said error diffusion operation and obtaining at least n error values;
    sub-sampling said n error values to obtain m error values, wherein m<n;
    storing said m error values in an error buffer;
    processing a second scanline of input pixel values according to said error diffusion operation and using error values selected from said m error values stored in said error buffer as input.

10. The digital image processing method as set forth in claim 9, wherein said step of sub-sampling said n error values comprises:
    defining m sub-groups of error values each comprising R error values;
    processing each of said m sub-groups to obtain an error value corresponding to said sub-group and based upon said R error values defining said sub-group.

11. The digital image processing method as set forth in claim 10, wherein said step of processing each of said m sub-groups comprises:
    averaging said R error values defining each of said m sub-groups.

12. The digital image processing method as set forth in claim 10, wherein said step of processing each of said m sub-groups comprises:
    summing said R error values defining each of said m sub-groups.

13. The digital image processing method as set forth in claim 9, wherein said step of processing at least a first scanline of input pixel values comprises processing multiple scanlines of input pixel values and wherein said step of sub-sampling said error values comprises a two-dimensional sub-sampling operation wherein said error values obtained from processing said multiple scanlines of input pixel values are combined in two-dimensions by one of an averaging and a summation operation.

14. The digital image processing method as set forth in claim 9, wherein said error diffusion operation further comprises:
    using an offset to control the effective location of said m error values in said error buffer to vary which of said m error values are used in processing each of said input pixel values during said step of processing said second scanline of input pixel values according to said error diffusion operation.

15. A digital image processing apparatus comprising:
an error buffer;
means for processing at least a first scanline of input pixel values according to a select error diffusion operation and obtaining at least n error values;
means for sub-sampling said n error values to obtain m error values, wherein m<n;
means for storing said m error values in said error buffer; and,
means for processing a second scanline of input pixel values according to said select error diffusion operation using error values selected from said m error values stored in said error buffer as input.

16. The apparatus as set forth in claim 15, wherein said means for sub-sampling said n error values comprises:
means for defining m sub-groups of error values each comprising R error values; and, means for processing each of said m sub-groups to obtain a single error value based upon said R error values defining said sub-group.

17. The apparatus as set forth in claim 16, wherein said means for processing each of said m sub-groups comprises:
means for averaging said R error values defining each of said m sub-groups.

18. The apparatus as set forth in claim 16, wherein said means for processing each of said m sub-groups comprises:
means for summing said R error values defining each of said m sub-groups.

19. The apparatus as set forth in claim 15, wherein said means for processing at least a first scanline of input pixel values comprises means for processing multiple scanlines of input pixel values and wherein said means for sub-sampling said error values comprises means for performing a two-dimensional sub-sampling operation wherein said error values obtained from said means for processing multiple scanlines of input pixel values are combined in two-dimensions by one of an averaging and a summation operation.

20. The apparatus as set forth in claim 15, further comprising:
means for introducing an offset to control an effective location of said m error values in said error buffer and for varying which of said m error values are used by said means for processing said second scanline of input pixel values.

* * * * *